(12) United States Patent
Gorday et al.

(10) Patent No.: US 7,693,191 B2
(45) Date of Patent: Apr. 6, 2010

(54) SYSTEM AND METHOD FOR RECEIVING A MULTIPLE FORMAT WIRELESS SIGNAL

(75) Inventors: Robert Mark Gorday, Wellington, FL (US); Mahibur Rahman, Lake Worth, FL (US); Jorge Ivonnet, Lake Worth, FL (US); Kevin McLaughlin, Lake Worth, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 445 days.

(21) Appl. No.: 11/691,301

(22) Filed: Mar. 26, 2007

(65) Prior Publication Data

US 2008/0240166 A1 Oct. 2, 2008

(51) Int. Cl.
*H04J 3/06* (2006.01)

(52) U.S. Cl. .................. 370/515; 370/320; 375/131; 375/136; 375/147

(58) Field of Classification Search .......... 370/509, 370/514; 375/131, 140, 130, 141
See application file for complete search history.

(56) References Cited

U.S. PATENT DOCUMENTS

| | | | | |
|---|---|---|---|---|
| 5,696,789 A | * | 12/1997 | Jones et al. | 375/130 |
| 5,946,343 A | * | 8/1999 | Schotz et al. | 375/141 |
| 6,088,402 A | * | 7/2000 | White | 375/326 |
| 6,128,512 A | * | 10/2000 | Trompower et al. | 455/561 |
| 6,424,631 B1 | * | 7/2002 | Czaja et al. | 370/252 |
| RE40,231 E | * | 4/2008 | Snell et al. | 375/130 |

* cited by examiner

*Primary Examiner*—Ricky Ngo
*Assistant Examiner*—Rasheed Gidado (57) ABSTRACT

An apparatus (200) and method (300) for receiving a communications signal. A spread spectrum signal demodulator (210) is adapted to demodulate a packet header (110) of a data packet (102) that is communicated by a wireless communications signal. The packet header (110) is modulated with a spread spectrum technique and the spread spectrum signal demodulator (210) produces a packet header detection signal (220) representing a successful detection of a predefined packet header value. A non-spread spectrum signal demodulator (212) is communicatively coupled to the spread spectrum signal demodulator (210) and demodulates, in response to the packet header detection signal (220), a non-spread spectrum modulated data payload within the data packet. A data output select (234) produces demodulated data produced by either one or both the spread spectrum signal demodulator (210) and the non-spread spectrum signal demodulator (212).

20 Claims, 4 Drawing Sheets

SYSTEM AND METHOD FOR RECEIVING A MULTIPLE FORMAT WIRELESS SIGNAL

BACKGROUND

1. Field

This disclosure relates generally to reception of digitally modulated wireless signals, and more specifically to reception of wireless signals modulated with both spread spectrum and non-spread spectrum modulation.

2. Related Art

Direct sequence spread spectrum communications systems operate by encoding each data bit over a number of modulated channel symbols, which are referred to as chips. Each channel symbol also encodes a pseudorandom data sequence. Although a direct sequence spread spectrum communications system includes modulation and receiving equipment that process the signal at the modulated chip rate, the user data throughput is reduced by the spread spectrum encoding. Direct sequence spread spectrum receivers correlate a received signal with a reproduction of the pseudorandom data sequence to extract the encoded data. The operation of direct sequence spread spectrum systems allows the communication of data with enhanced interference rejection.

One direct sequence spread spectrum communications application is the IEEE 802.15.4 communications standard. The incorporation of direct sequence spread spectrum signals in the IEEE 802.15.4 communications standard allow reliable communications over an extended range. This use of direct sequence spread spectrum signals, however, reduces the data throughput of IEEE 802.15.4 systems relative to the total bandwidth consumed by the system and the corresponding capacity of the processing hardware of the communications equipment.

Therefore, a technique that would allow the hardware used to implement an IEEE 802.15.4 receiver to communicate at a higher data rate throughput than is supported by that standard expands the usability of that hardware.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
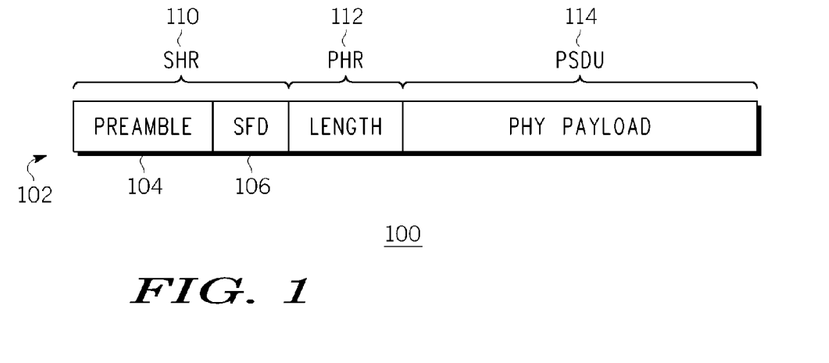
FIG. 1 illustrates a data packet format used for data communications in accordance with one embodiment of the present invention.

FIG. 1 illustrates a data packet format 100 used for data communications in accordance with one embodiment of the present invention. The data packet format 100 defines a format for encoding and creating a data packet 102. The data packet 102 of one embodiment has three portions, a header portion 110, a payload data length portion 112 and a data payload portion 114. A data payload for a data packet 102 is able to consist of only the data payload portion 114 or both the payload data length portion 112 and the data payload portion 114.

The data packet format 100 is used by one embodiment of the present invention to communicate data using one of two modulation and encoding formats. The data packets 102 of one embodiment use the same modulation and encoding formats for the header portion 110 of the data packet. The payload data length portion 112 and the data payload portion 114 are able to be modulated and encoded according to one of two formats. The payload data length portion 112 and the data payload portion 114 of the data packet 102 are able to be modulated and encoded by using either spread spectrum modulation as defined by the IEEE 802.15.4 standard or alternatively by using a non-spread spectrum modulation whereby user data bits are encoded into the channel symbols within the payload data length portion 112 and the data packet portion 114. The use of non-spread spectrum modulation for transmission of data in the payload data length portion 112 and the data payload portion 114 allows greater data rate throughput for close range communications.

One embodiment of the present invention transmits data using channel symbols, or spreading "chips," as are defined for the IEEE 802.15.4 standard. The IEEE 802.15.4 standard defines operation in two RF bands and defines modulation using either BPSK or phase coherent, offset Quadrature Phase Shift Keying (O-QPSK) chip modulation based upon the RF band of operation.

The packet header portion 110 of the data packet format 100 includes two fields, a preamble field 104 and a Start of Frame Delimiter (SFD) 106. The location and size of these two fields within the packet header portion 110 are defined pursuant to packet header formats defined by the IEEE 802.15.4 standard. The preamble field 104 contains a defined data pattern that allows a receiver to acquire and synchronize to the channel symbol transitions of the data packet 102. The start of frame delimiter 106 of one embodiment contains a value that defines the modulation and encoding format used for the payload data length portion 112 and the data payload portion 114, as is described below.

The payload data length portion 112 of the data packet 102 defines the number of bits contained in the data payload portion 114 of the data packet 102. One embodiment of the present invention uses different number of bits for the payload data length portion 112 when the payload data length portion 112 and the data payload portion 114 are modulated with spread spectrum modulation or with non-spread spectrum modulation. One embodiment encodes the payload data length portion 112 that is modulated with a non-spread spectrum format with a larger number of bits than a payload data length portion 112 conforming to the format defined pursuant to IEEE 802.15.4. A larger number of bits is used for the payload data length portion 112 when non-spread spectrum modulation is used to accommodate the larger number of user bits that are able to be transferred by the data payload portion 114 when non-spread spectrum modulation is used. When spread spectrum modulation is used, the payload data length portion 112 defined by the IEEE 802.15.4 standard is used by one embodiment.

The start of frame delimiter 106 of one embodiment of the present invention is able to contain one of two pre-defined values, a start of frame delimiter value defined pursuant to IEEE 802.15.4 and a start of frame delimiter value not defined by IEEE 802.15.4. These two start of frame delimiter (SFD) values each identifies a particular modulation and encoding format for the data payload portion 114. A first pre-defined value for the start of frame delimiter 106 is 'A7' in hexadecimal, which corresponds to the value of the start of frame delimiter 106 defined by the IEEE 802.15.4 standard. A second pre-defined value for the start of frame delimiter 106 is a pre-defined value that is not defined as a valid start of frame delimiter by the IEEE 802.15.4standard, and the second pre-defined value for the start of frame delimiter indicates that the payload data length portion 112 and the data payload portion 114 are modulated by a non-spread spectrum modulation technique. One embodiment of the present invention modulates data bits in the payload data length portion 112 and the data payload portion 114 using the same modulation technique as the modulation technique defined for modulation of spreading chip symbols of the IEEE 802.15.4 standard. When modulating with a non-spread spectrum modulation, however, each user data bit is encoded into one channel bit.

Figure 2:
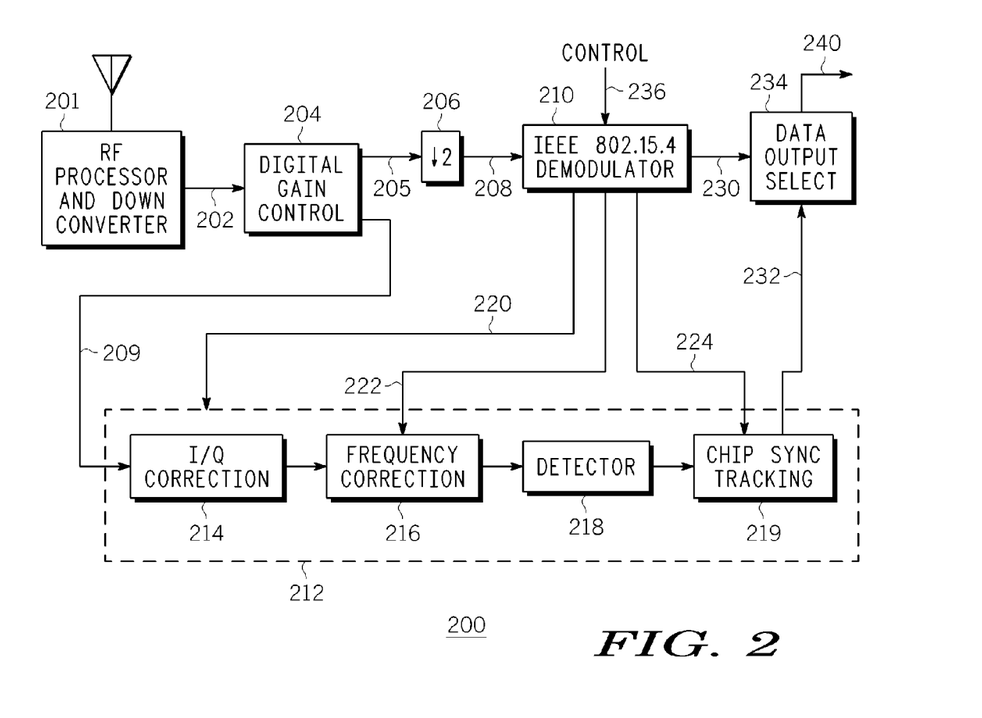
FIG. 2 illustrates a block diagram for a multi-mode receiver in accordance with one embodiment of the present invention.

FIG. 2 illustrates a block diagram for a multi-mode receiver 200 in accordance with one embodiment of the present invention. The multi-mode receiver 200 of one embodiment of the present invention operates to receive and process signals conveying the above described data packet 102, which is able to have a payload data length portion 112 and a data payload 114 that are modulated and encoded in either one of two formats. The multi-mode receiver 200 is able to receive signals that are modulated and encoded according to the IEEE 802.15.4 standard that includes transmitting data packets with a header and a data payload portion that are both modulated with a spread spectrum modulation technique. The multi-mode receiver 200 is further able to receive signals that are modulated in the above described manner that includes a header portion 110 that is modulated with a spread spectrum technique and a payload data length portion 112 and a data payload portion 114 that are modulated with a non-spread spectrum technique.

Data packets 102 that are modulated and encoded with either of the above described formats have a packet header that conforms to the modulation and encoding format defined by IEEE 802.15.4. The use of the same header format, with the exception of different values for the start of frame delimiter 106, for both types of possible data packet modulation and encoding techniques allows the multi-mode receiver 200 to have a single processor to process and identify the modulation and encoding type that is used to encode the payload data length portion 112 and the data payload portion 114 of the data packet 102.

The multi-mode receiver 200 is able to identify the value used for the start of frame delimiter 106 through uniform processing of the packet header and thereby determine the processing to be used to extract data from the payload data length portion 112 and the data payload portion 114 of that data packet 102. Selection of the processing used to extract data from the data payload 114 during decoding of the packet header portion 110, and therefore before beginning to process the payload data length portion 112 and the data payload 114, allows energy conservation in the multi-mode receiver 200 since only the signal processing portion that is required to demodulate the payload data length portion 112 and the data payload portion 114 of the data packet 102 is required to operate and consume power.

The multi-mode receiver 200 receives RF signals through an antenna 250 and processes the received RF signals through an RF processor and downconverter 201. In one embodiment, the RF processor and downconverter 201 is optimized to process spread spectrum signals. In optimizing the RF processor and downconverter 201 to process spread spectrum signals, design choices are made to reduce the linear dynamic range, reduce the RF center frequency accuracy and phase stability of the processing to conserve product cost and energy.

The RF processor and downconverter 201 of one embodiment produces discrete time complex value baseband signals 202 that represent the received wireless communications signal. The complex baseband signals 202 produced by the RF processor and downconverter 201 are represented as two channels, an in-phase (I) channel and a quadrature (Q) channel. In one embodiment, each of these complex signal channels is represented by a discrete time signal consisting of eleven (11) bit samples for each channel.

The complex baseband signals 202 are provided to a digital gain control processor 204 that normalizes the complex baseband signals 202 to maximize the dynamic range of subsequent processing stages. The digital gain control processor 204 produces two data streams, a spread spectrum baseband output 205 and a high dynamic range signal output 209. The spread spectrum baseband output 205 is processed by a decimator 206 that produces a decimated signal 208 that contains samples at half of the sample rate contained within the spread spectrum baseband output 205. Stated another way, the decimated signal 208 contains every other sample contained in the spread spectrum baseband output 205. The decimated signal 208 includes an in-phase and a quadrature channel that each has four bits of resolution. The high dynamic range signal output 209 consists of two channels, an in-phase channel and a quadrature channel, that each has eight bits of resolution.

The decimated signal 208 is provided to a spread spectrum demodulator 210. The spread spectrum demodulator 210 of one embodiment processes received signals that are modulated and encoded according to the IEEE 802.15.4 standard. The IEEE 802.15.4 standard specifies that the RF signals are modulated with a spread spectrum modulation scheme. The spread spectrum demodulator 210 of one embodiment produces additional signals that are used to assist the operation of a non-spread spectrum signal demodulator 212, which is described in further detail below. The spread spectrum demodulator 210 of one embodiment produces, in addition to data detected by the demodulation of a packet data payload 114 that is modulated with a spread spectrum technique, a non-spread spectrum demodulator enable output 220, a center frequency correction output 222 and a chip transition time synchronization signal 224. These three outputs are used by the non-spread spectrum signal demodulator 212 as is described in detail below.

The spread spectrum demodulator 210 processes the received RF signal to identify data packet headers and extract the start of frame delimiter contained in the start of frame delimiter. The spread spectrum signal demodulator 210 demodulates a packet header 110 of a data packet communicated by a wireless communications signal. The packet header 110 is modulated with a spread spectrum technique. The spread spectrum signal demodulator 210 produces a packet header detection signal that represents a successful detection of a predefined packet header value, such as the start of frame delimiter values described below.

The spread spectrum demodulator 210 demodulates and decodes the packet headers 110 of all received data packets 102. In addition to the ordinary processing of the data packet header 110, the spread spectrum demodulator 210 analyzes the value of the start of frame delimiter field 106 within the packet header 110 to determine the type of processing to be performed to extract data from the data payload portion of the data packet.

In one embodiment of the present invention, one particular value of the start of frame delimiter indicates that the data packet is modulated and encoded according to the IEEE 802.15.4 standard. In the event that the spread spectrum demodulator detects that the packet header contains the start of frame delimiter value indicating a packet that is defined by the IEEE 802.15.4 standard, the spread spectrum demodulator configures itself to process the data payload portion of the data packet according to the IEEE 802.15.4 standard to extract the payload data.

In the event that the spread spectrum demodulator 210 receives a data packet with a header containing the start of frame delimiter value that indicates the data packet contains a non-spread spectrum payload, the spread spectrum demodulator 210 asserts the enable output 220 to enable the non-spread spectrum demodulator 212. The enable output 220 of one embodiment is a packet header detection signal that represents a successful detection of a start of frame delimiter value recognized by the spread spectrum demodulator. The start of frame delimiter values that are recognized by the spread spectrum demodulator, i.e., those values that will trigger processing of a data payload of a received data packet, corresponds to a predefined packet header value. The spread spectrum demodulator 210 determines the center frequency correction value and timing synchronization to be applied to properly achieve demodulation synchronization with the chips/symbols of the received signal. In the case of receiving a data packet that contains a non-spread spectrum payload, the spreading chip transitions correspond to data carrying symbols of that payload. The spread spectrum demodulator 210 provides a center frequency correction value 222 and chip transition time synchronization signal 224 to assist the non-spread spectrum demodulator 212 in rapidly synchronizing to and tracking the high dynamic range signal output 210 to demodulate and decode the data contained in the non-spread spectrum data payload.

The non-spread spectrum demodulator 212 accepts the high dynamic range signal output 209 and performs processing on the received complex signal to compensate for distortions introduced by the preceding processing circuits, such as the RF processor and downconverter 201. Some of the distortions introduced by the preceding processing circuits are a result of optimizations and design choices for those circuits to process received spread spectrum signals for demodulation. Design choices made for those circuits include having reduced performance regarding, for example, linear dynamic range for the complex baseband signal, center frequency tracking accuracy, and phase stability. Demodulation performance of the non-spread spectrum demodulator 212 of one embodiment is improved by processing the received signal to compensate for, i.e., partially or mostly remove, those distortions.

The non-spread spectrum demodulator 212 includes an I/Q correction processor 214, which is a complex signal correction stage, that is used to correct for receiver distortion of the high dynamic range signal output 209, including amplitude and phase imbalance between the in-phase and quadrature channels of the complex values contained in the high dynamic range signal output 209. The I/Q correction processor 214 of one embodiment corrects the complex signal received as the high dynamic range signal output 209 by applying complex magnitude and phase corrections to the wireless communications signal prior to demodulation by the non-spread spectrum signal demodulator. The I/Q correction processor 214 of one embodiment applies fixed correction factors consisting of complex magnitude and phase corrections that are individually adapted to each communications signal receiver unit. These individually adapted complex magnitude and phase corrections are determined for each individual multi-mode receiver 200 during manufacturing. In one embodiment, manufacturing acceptance testing characterizes the distortions introduced by the processing stages that precede the non-spread spectrum demodulator 212 and programs the I/Q correction processor 214 to compensate for those individualized distortions. Further embodiment of the present invention use a pre-defined set of correction factors that are programmed into all manufactured multi-mode receivers 200 without any individualization.

The non-spread spectrum demodulator 212 further includes a frequency correction processor 216. The spread spectrum demodulator 210 produces a frequency correction signal 222 that indicates a received frequency offset for the wireless communications signal, and the frequency correction processor 216 receives the frequency correction signal 222 and adjusts a communications signal frequency offset based upon the frequency correction signal. The frequency correction processor 216 corrects center frequency errors of the received signal represented as the high dynamic range signal output 209 due to, for example, frequency drift or errors in the tuning of preceding processing stages. The multi-mode receiver 200 uses accurate center frequency correction information that was determined during the demodulation of the packet header portion 110 of this data packet. The packet header portion 110 is modulated with a spread spectrum technique, and the spread spectrum demodulator 210 determines center frequency corrections to be applied to the baseband signal as part of the processing of the packet header 110. The center frequency corrections determined by the spread spectrum demodulator 210 are provided to the frequency correction processor 216 of the non-spread spectrum demodulator 212 through the center frequency correction value 222. Since the spread spectrum demodulator 210 processes baseband signal samples that are derived from the same source as the signal samples processed by the non-spread spectrum demodulator 212, the center frequency correction value derived by the spread spectrum demodulator 210 correspond to the frequency corrections that should be applied by the non-spread spectrum demodulator 212.

The non-spread spectrum demodulator 212 includes a detector 218. The detector 218 of one embodiment is able to be a Frequency Modulation (FM) discriminator to detect phase coherent offset QPSK modulation or a differential phase detector to detect BPSK modulation. In the case of an RF processor and downconverter 201 that exhibits higher levels of phase noise, the baseband signal is observed to have a phase noise characteristic that has higher phase noise energy at lower frequencies with the phase noise energy falling off with increasing frequency within the baseband. FM discriminators exhibit a high pass response to noise within the detection bandwidth, and are therefore less sensitive to the phase noise energy that is typically exhibited by higher phase noise receivers. Differential phase detectors similarly exhibit a high pass filter response to noise disturbance. The use of these detectors that have a high pass frequency response for phase noise sensitivity compensates for the phase noise characteristic of the RF processor and downconverter 201.

The output of the detector 218 contains levels corresponding to channel symbols of the received data packet and is provided to a chip synchronization tracking processor 219. The chip synchronization tracking processor 219 makes bit decisions for the channel symbols of the payload data length portion 112 and the data payload portion 114 of received data packets where those portions are not modulated with a spread spectrum technique. The spread spectrum demodulator 210 produces a channel symbol time synchronization signal 224 that indicates a chip transition time for the wireless communications signal. The chip synchronization tracking processor 219 accepts the channel symbol time synchronization signal 224 from the spread spectrum demodulator 210 and synchronizes demodulation of the non-spread spectrum modulated data payload based upon the chip transition time synchronization signal 224. The chip transition time synchronization signal 224 assists the chip synchronization tracking processor 219 in acquiring chip/channel symbol transition timing to assist in properly timing bit decisions for the payload data length portion 112 and the data payload portion 114 to extract the data conveyed therein.

The channel symbol time synchronization signal 224 of one embodiment of the present invention serves as a frame synchronization signal that indicates a start of a data frame defined by the data packet format 100, such as the start of the payload data length portion 112. For example, the channel symbol time synchronization signal 224 is asserted at the beginning of the first bit of the payload data length portion 112 to indicate the beginning of that field within the data frame structure defined for the data packet format 100. Demodulated data is produced by the non-spread spectrum signal demodulator 212 once it is synchronized to the beginning of the data payload within the data frame structure defined by the data packet format 100, based upon receipt of the channel symbol time synchronization signal 224.

The non-spread spectrum signal demodulator 212 demodulates, in response to receiving the packet header detection signal, a non-spread spectrum modulated data payload within the data packet. Elements of the non-spread spectrum demodulator 212 of one embodiment, including the I/Q correction processor 214, the frequency correction processor 216, the detector 218 and the chip synchronization tracking processor 219, are able to be enabled or disabled under the control of the enable signal 220 generated by the spread spectrum demodulator 210 or and control 236 as received by the spread spectrum demodulator 210. Disabling of the components of the non-spread spectrum demodulator, in response to the enable signal 220, is able to be implemented by gating the processing clocks of those circuits, gating the input data to those circuits (e.g., by gating the high dynamic range signal output 209), disabling power to those circuits, or by any suitable techniques. One embodiment of the present invention has a spread spectrum demodulator 210 that only enables portions of the non-spread spectrum demodulator 212, by asserting the enable signal 220, when a data packet containing a non-spread spectrum modulated payload data length portion 112 or a non-spread spectrum modulated data payload portion 114 is detected. The enabling and disabling of the non-spread spectrum demodulator in this manner conserves energy by only enabling those circuits when they are needed. Some embodiments of the present invention disable some portions of the spread spectrum demodulator 210 when a non-spread spectrum modulated payload data length portion 112 or a data payload portion 114 is being processed, and the non-spread spectrum demodulator 212 is enabled, since those spread spectrum demodulator circuits are not required at that time.

The spread spectrum demodulator 210 and the non-spread spectrum demodulator 212 each produce a three line data output that represents the data conveyed in the data payload portion 114. The three lines of these data outputs include a data bit output line, a data bit clock line and a data start indicator to indicate the beginning of an output data bit frame. The spread spectrum demodulator 210 has a three line output that produces an IEEE 802.15.4 data stream 230 that has a maximum bit rate of 250 Kbits per second. The non-spread spectrum demodulator 212 has a three line output that produces a high data rate data stream 232 that has a maximum bit rate of 2,000 Kbits per second. Both of these three bit data output are provided to a receiver data output select 234 that is a data multiplexer that selects, based on the type of data packet 102 being received, either the IEEE 802.15.4 data stream 230 or the high data rate data stream 232. The receiver data output select 234 has a receiver output interface 240 that has the three signal lines described above for IEEE 802.15.4 data stream 230 and the high data rate data stream 232. The receiver output selection switch of one embodiment is a data output adapted to produce demodulated data produced by either one of both the spread spectrum signal demodulator 210 and the non-spread spectrum signal demodulator 212.

The spread spectrum demodulator 210 accepts a non-standard receiver control signal 236. The non-standard receiver control signal 236 commands the spread spectrum demodulator 210, and thereby the multi-mode receiver 200, to process 1) IEEE 802.15.4 packets only; 2) data packets that have headers corresponding to the IEEE 802.15.4 standard, but that have payload data length portions 112 and data payload portions 114 modulated with a non-spread spectrum technique, only: or 3) either of these two types of packets, as is determined by the value of the start of frame delimiter within each received packet.

Figure 3:
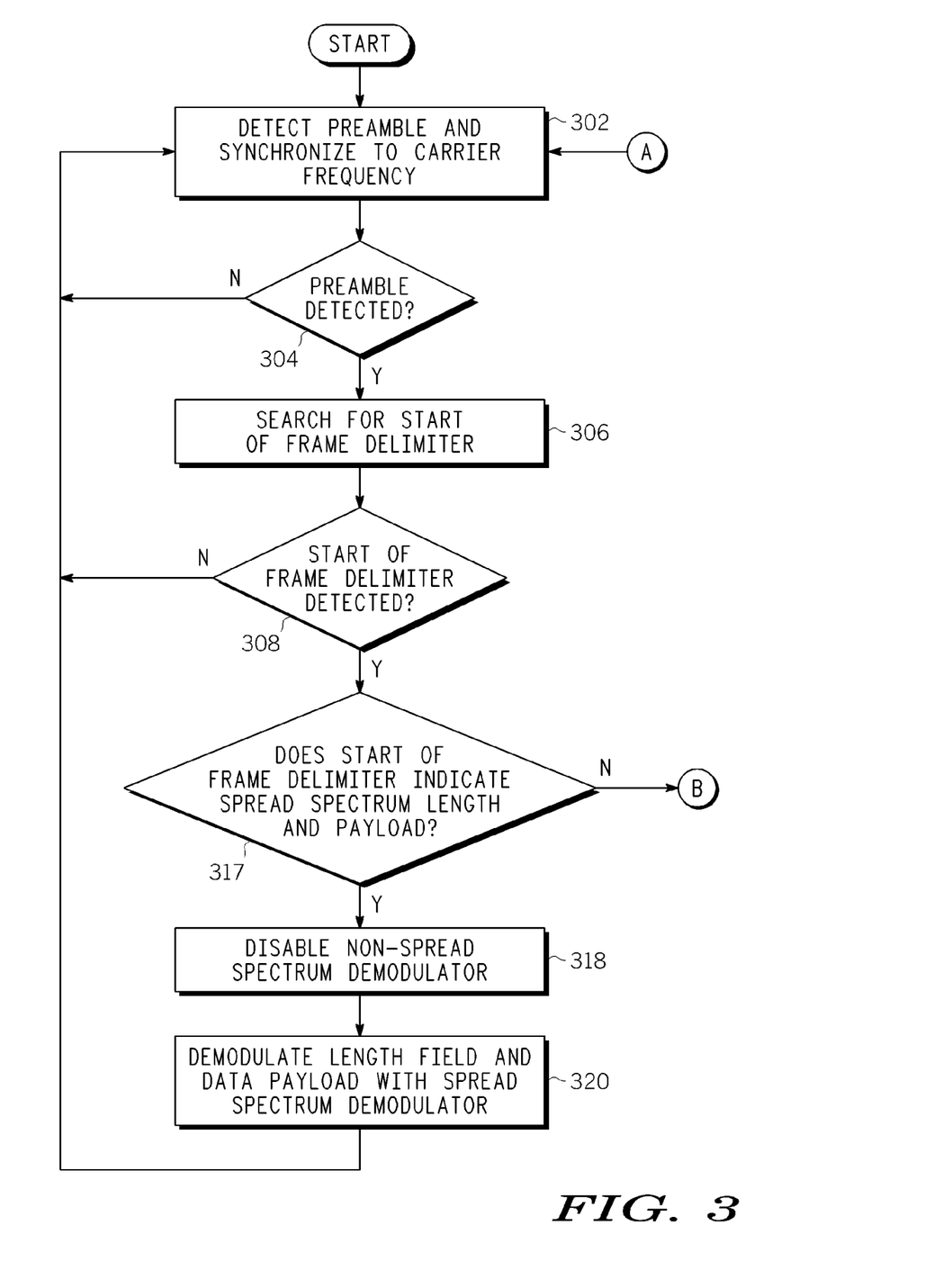
FIGS. 3 and 4 illustrate a processing flow diagram for reception of a data packet as performed by a multi-mode receiver as shown in FIG. 2, in accordance with one embodiment of the present invention.
Figure 4:
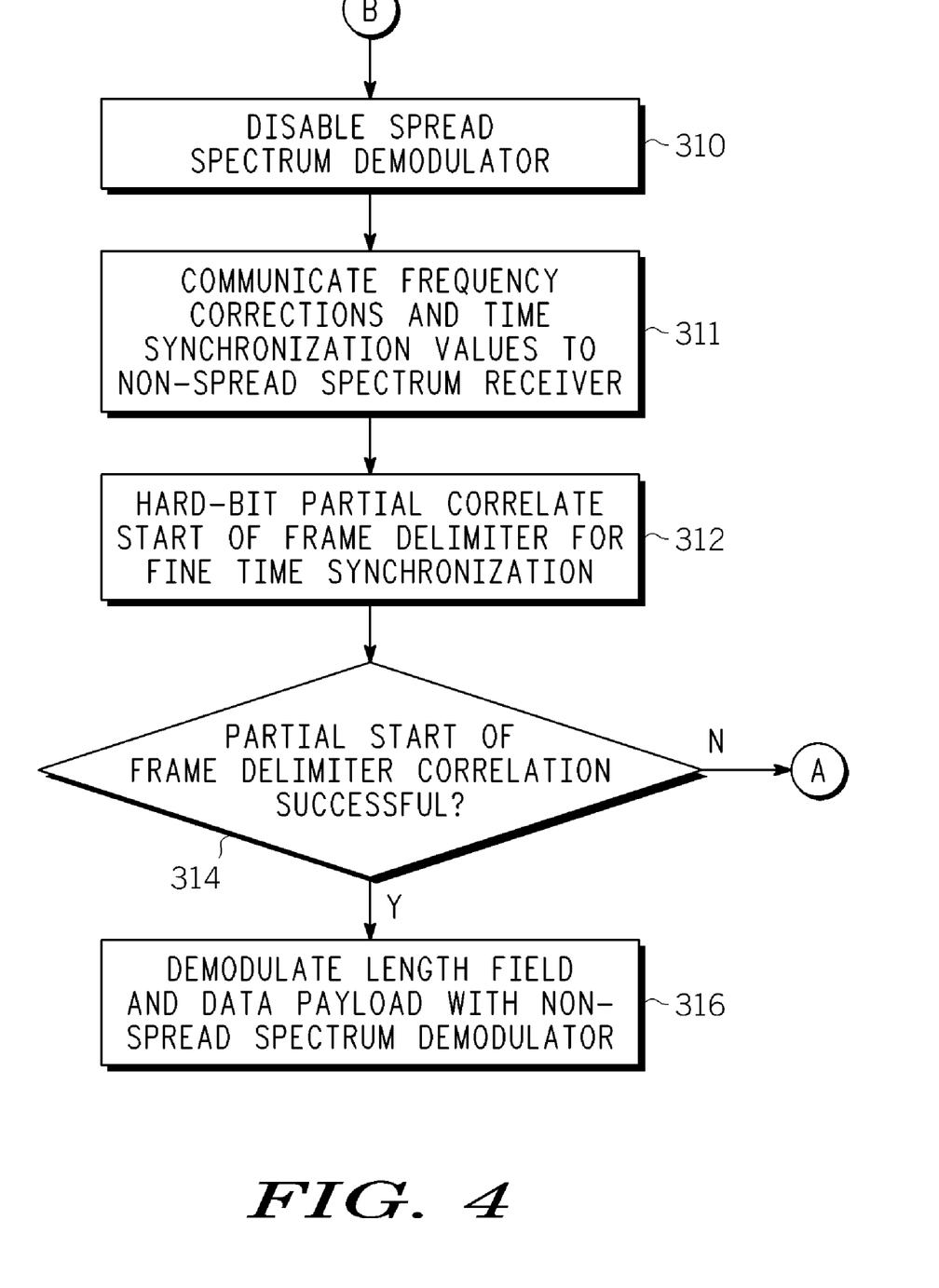

FIGS. 3 and 4 illustrate a processing flow diagram for reception of a data packet 300 as performed by a multi-mode receiver 200 as shown in FIG. 2, in accordance with one embodiment of the present invention. Beginning with FIG. 3, the reception of a data packet 102 begins by performing, at step 302, preamble detection and carrier frequency synchronization. One embodiment of the present invention includes multi-mode receivers 200 that continually operate to detect preambles 104 of received data packets 102. In the course of receiving and processing the preambles 104 of the received data packets 102, the processing will synchronize to the carrier frequency of the received data packet 102 and determine a carrier frequency correction to be applied during subsequent processing by either the spread spectrum demodulator 210 or the non-spread spectrum demodulator 212. The frequency synchronization will also determine chip rate clock corrections for the local chip rate clock of the spread spectrum demodulator 210 so that the receiver is able to properly decode the modulated signal. Chip transition time synchronization signal 224 is also provided to the non-spread spectrum demodulator 212 to assist the demodulator in extracting the data encoded in packets with a non-spread spectrum payload.

The processing proceeds by determining, at step 304, if a preamble has been detected within the received RF signal. The preamble is detected in one embodiment of the present invention by the spread spectrum demodulator 210 since the preambles of all data packets processed by the multi-mode receiver 200 have preambles encoded by spread spectrum techniques. If no preamble is detected, the processing returns to performing, at step 302, preamble detection and frequency synchronization as is described above.

If a preamble has been detected, the processing continues by searching, at step 306, for a start of frame delimiter value within the received data packet. As described above, different start of frame detector values are used in data packets 102 to identify if the payload data length portion 112 or the data payload portion 114 is modulated with a spread spectrum technique or with a non-spread spectrum technique. The spread spectrum demodulator 210 of one embodiment searches for and determines the start of frame delimiter within received packets because the start of frame delimiter is modulated with a spread spectrum technique for all data packets processed by the multi-mode receiver 200. The spread spectrum demodulator 210 further determines, as part of the searching for the start of frame delimiter value within the received data packet, a first payload bit synchronization signal that indicates a start of a bit transition for a first bit within the non-spread spectrum modulated data payload. This first payload bit synchronization in one embodiment is included as the chip transition time synchronization signal 224 that is provided to the chip synchronization tracking processor 219.

The processing continues to determine, at step 308, if a valid start of frame delimiter has been detected. In one embodiment, valid start of frame delimiter values include the value defined for IEEE 802.15.4 messages and also a pre-defined delimiter that indicates that the payload data length portion 112 and the data payload portion 114 are modulated with a non-spread spectrum technique. If a valid start of frame delimiter value is not detected, the processing returns to performing, at step 302, preamble detection and frequency synchronization as is described above. If a valid start of frame delimiter is detected, the processing proceeds to determining, at step 317, if the start of frame delimiter indicates that the received data packet has a payload data length portion 112 and a data payload portion 114 that are modulated with a spread spectrum technique or with a non-spread spectrum technique.

If the start of frame delimiter indicates that the payload data length portion 112 and the data payload portion 114 are modulated with a spread spectrum technique, the processing continues by disabling, at step 318, the non-spread spectrum demodulator 212. The processing continues by demodulating, at step 320, the payload data length portion 112 and the data payload portion 114 of the received data packet with the spread spectrum demodulator 210. In one embodiment, this processing is similar to the processing used to receive and demodulate received data packets that conform to the IEEE 802.15.4 standard.

If the start of frame delimiter indicates that the received data packet has a payload data length portion 112 and a data payload portion 114 and that the received data packet is modulated with a non-spread spectrum technique, then the processing disables, at step 310 as is illustrated in FIG. 4, the spread spectrum demodulator circuits that would operate to demodulate the data payload portion 114 if it were modulated with a spread spectrum technique. The processing then communicates, at step 311, frequency correction values 222 and chip transition time synchronization signal 224 to the non-spread spectrum demodulator 212 to assist in processing of the received data symbols.

The processing continues by correlating, at step 312, the received start of frame delimiter with the known data pattern of the start of frame delimiter that indicates that the data payload is modulated with a non-spread spectrum modulation. This correlation is performed by the non-spread spectrum demodulator 212 in one embodiment to perform fine time synchronization with the chip/data symbols modulated onto RF signal. The fine time synchronization allows more accurate channel symbol sampling and data bit decisions. One embodiment of the present invention performs a hard-bit partial data pattern correlation with the start of frame delimiter values channel symbol values of the received data packet to determine if a suitable number of detected channel bits within the start of frame delimiter were properly detected without spread spectrum demodulation. The processing then determines, at step 314, if the partial correlation of the start of frame delimiter successfully detected the start of frame delimiter. Failure to successfully detect the proper start of frame delimiter indicates that the non-spread spectrum demodulator 212 is producing too many bit detection errors to properly detect the data conveyed by the non-spread spectrum modulated portions of the received data packet. In one embodiment, failure to successfully detect the proper start of frame delimiter causes the multi-mode receiver 200 to stop processing of the received data packet and return to performing, at step 302, preamble detection and frequency synchronization.

If the start of frame delimiter is successfully detected by the non-spread spectrum receiver 212, the processing continues by demodulating, at step 316, the payload data length portion 112 and data payload portion 114 of the received data packet by using the non-spread spectrum demodulator 212. The processing then returns to performing, at step 302, preamble detection and frequency synchronization.

Figure 5:
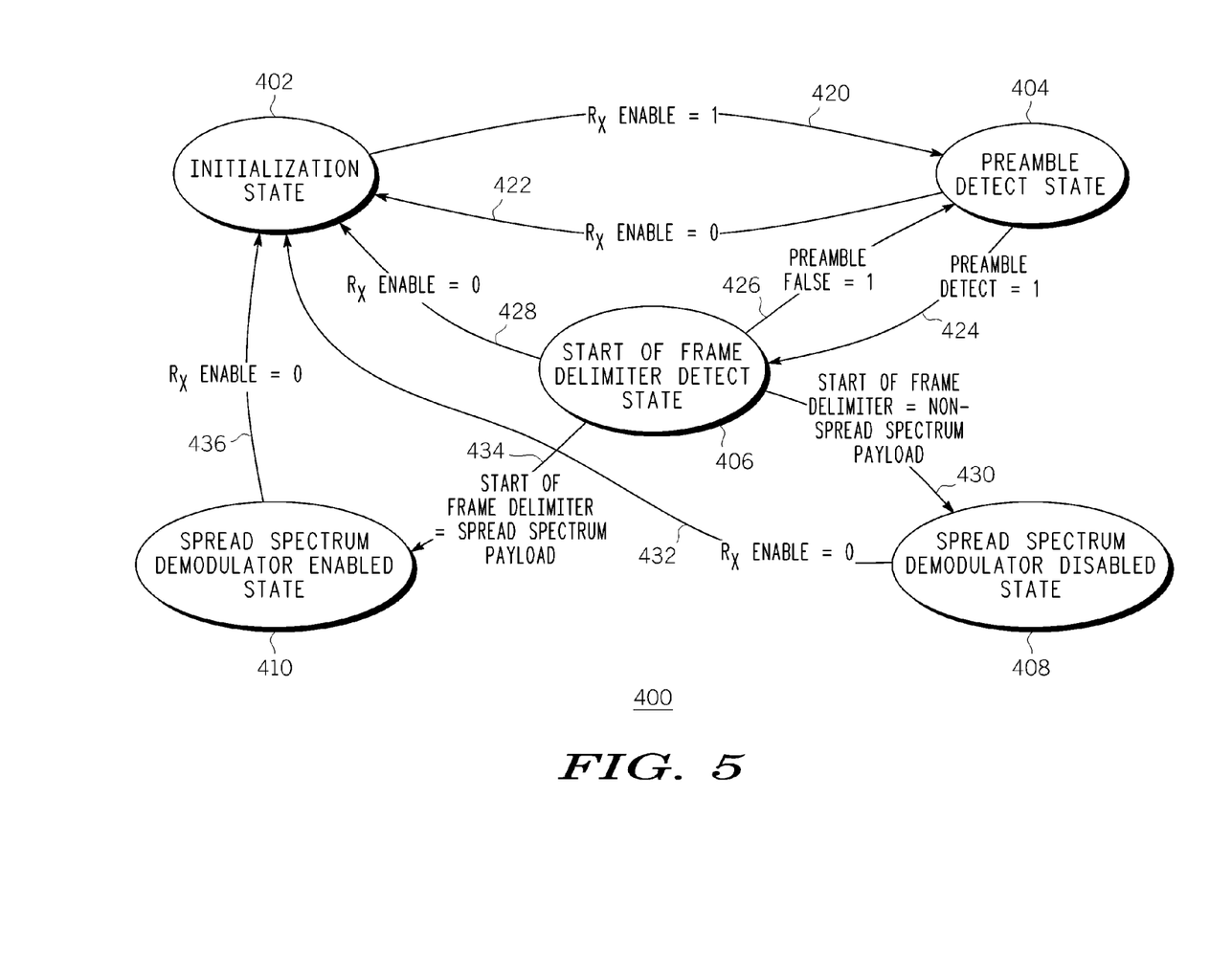
FIG. 5 illustrates a state transition diagram 400 for a multi-mode receiver as shown in FIG. 2, in accordance with an embodiment of the present invention.

FIG. 5 illustrates a state transition diagram 400 for a multi-mode receiver 200 as shown in FIG. 2, in accordance with an embodiment of the present invention. The multi-mode receiver 200 begins in an initialization state 402. The processing performed in the initialization state 402 includes initializing the processing circuits of the multi-mode receiver 200. Circuits external to the multi-mode receiver 200 enable the receiver and trigger the receiver enable transition 420 to cause the state transition to the preamble detect state 404. The processing of the multi-mode receiver 200 in the preamble detect state 404 includes processing by the spread spectrum receiver 210 to detect preamble portions 104 of received data packets 102. If the receiver enable is de-asserted while in the preamble detect state 404, the processing returns to the initialization state 402 through a first receiver not enabled transition 422.

In the event that a preamble of a received data packet is detected while in the preamble detect state 404, the Preamble Detect event 424 is asserted causing the processing to transition to the Start of Frame Delimiter (SFD) detect state 406. While in the SFD detect state 406, the processing determines if a valid value of the start of frame delimiter is contained within the received data packet. If no valid start of frame value is detected within the received data packet, the Preamble False event 426 is asserted and the processing returns to the preamble detect state 404. If receiver enable is unasserted while the processing is in the SFD detect state 406, the processing returns to the initialization state 402 through a second receiver not enabled transition 428.

If the processing determines, while in the SFD detect state 406, that the received data packet has a start of frame delimiter value that indicates that the payload data length portion 112 and the data payload portion 114 of the received data packet 102 are modulated with a non-spread spectrum technique, the processing transitions through a SFD=non-spread spectrum payload transition 430 to a spread spectrum demodulator disabled state 408. In the spread spectrum demodulator disabled state 408, the portions of the spread spectrum demodulator 210 that would process the payload data length portion 112 and the data payload portion 114 are disabled to conserve energy. Once the data payload portion 114 of the received data packet is demodulated, a third receiver not enabled transition 432 causes the receiver to return to the initialization state 402.

If the processing determines, while in the SFD detect state 406, that the data packet has a start of frame delimiter value that indicates that the payload data length portion 112 and the data payload portion 114 of the received data packet are modulated with a spread spectrum technique, the processing transitions through a SFD=spread spectrum payload transition 434 to a spread spectrum demodulator enabled state 410.

In the spread spectrum demodulator enabled state 410, the spread spectrum demodulator 210 is enabled to process the payload data length portion 112 and the data payload portion 114. The non-spread spectrum demodulator 212 is disabled in this state to conserve energy. Once the data payload portion 114 of the received data packet is demodulated, a fourth receiver not enabled transition 436 causes the receiver to return to the initialization state 402.

It should be understood that all circuitry described herein may be implemented either in silicon or another semiconductor material.

Although the invention is described herein with reference to specific embodiments, various modifications and changes can be made without departing from the scope of the present invention as set forth in the claims below.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A communications signal receiver, comprising:
    a spread spectrum signal demodulator for demodulating a packet header of a data packet communicated by a wireless communications signal, the packet header being modulated with a spread spectrum technique, the spread spectrum signal demodulator producing a packet header detection signal representing a successful detection of a predefined packet header value;
    a non-spread spectrum signal demodulator, communicatively coupled to the spread spectrum signal demodulator, the non-spread spectrum signal demodulator for demodulating, in response to the packet header detection signal, a non-spread spectrum modulated data payload within the data packet; and
    a data output selector for selecting demodulated data produced by either one or both the spread spectrum signal demodulator and the non-spread spectrum signal demodulator.

2. The communications signal receiver of claim 1,
    wherein the spread spectrum demodulator further produces a frequency correction signal indicating a received frequency offset for the wireless communications signal, and
    wherein the non-spread spectrum signal demodulator receives the frequency correction signal and adjusts a communications signal frequency offset based upon the frequency correction signal.

3. The communications signal receiver of claim 1,
    wherein the spread spectrum demodulator further produces a channel symbol time synchronization signal indicating a chip transition time for the wireless communications signal, and
    wherein the non-spread spectrum signal demodulator receives the chip transition time synchronization signal and synchronizes demodulation of the non-spread spectrum modulated data payload based upon the chip transition time synchronization signal.

4. The communications signal receiver of claim 3, wherein the channel symbol time synchronization signal comprises a first payload bit synchronization signal indicating a start of a bit transition for a first bit within the non-spread spectrum modulated data payload.

5. The communications signal receiver of claim 1, wherein the non-spread spectrum signal demodulator further comprises a complex signal correction stage for applying complex magnitude and phase corrections to the wireless communications signal prior to demodulation by the non-spread spectrum signal demodulator.

6. The communications signal receiver of claim 1,
    wherein the data packet comprises a data frame structure,
    wherein the spread spectrum signal demodulator produces a frame synchronization signal indicating a start of a data frame within the data frame structure, and
    wherein the non-spread spectrum signal demodulator receives the frame synchronization signal and produces the demodulated data based upon the frame synchronization signal.

7. The communications signal receiver of claim 1,
    wherein the non-spread spectrum signal demodulator further performs a second packet header value detection by correlating a start of frame delimiter portion of the packet header with the predefined packet header value, and
    wherein the non-spread spectrum signal demodulator demodulates in response to the second packet header value detection.

8. The communications signal receiver of claim 1, further comprising:
    a radio frequency signal processor, communicatively coupled to the spread spectrum signal demodulator and the non-spread spectrum signal demodulator, for producing a complex value baseband signal representing the wireless communications signal, the radio frequency signal processor having a phase noise characteristic, and
    wherein the non-spread spectrum signal demodulator comprises at least one of a frequency modulation discriminator and a differential phase detector, the at least one of the frequency modulation discriminator and the differential phase detector having a high pass frequency response for phase noise sensitivity that compensates for the phase noise characteristic.

9. The communications signal receiver of claim 8, wherein the non-spread spectrum signal demodulator further comprises a complex signal correction stage for applying complex magnitude and phase corrections to the wireless communications signal prior to demodulation by the non-spread spectrum signal demodulator, and wherein the complex magnitude and phase corrections are individually applied to each communications signal receiver unit.

10. The communications signal receiver of claim 1,
    wherein the wireless communications signal comprises a packet header corresponding to a packet header format defined pursuant to IEEE 802.15.4,
    wherein the predefined packet header value comprises one of a start of frame delimiter value defined pursuant to IEEE 802.15.4 which indicates that the data packet conforms to a format defined pursuant to IEEE 802.15.4, and a start of frame delimiter value not defined by IEEE 802.15.4 which indicates that the data payload comprises a payload data length portion and a data payload portion and that the data payload is modulated with a non-spread spectrum technique, and
    wherein the spread spectrum signal demodulator demodulates, in response to detecting the start of frame delimiter defined by IEEE 802.15.4, the data payload.

11. The communications signal receiver of claim 10, wherein the payload data length portion that is modulated with a non-spread spectrum technique has a larger number of bits than a payload data length portion conforming to the format defined pursuant to IEEE 802.15.4.

12. A method for receiving a wireless data packet, the method comprising:
    demodulating, in a communications receiver, a packet header of a data packet communicated by a wireless communications signal, the packet header being modulated with a spread spectrum technique;
    producing, in response to the demodulating, a packet header detection signal representing a successful detection of a predefined packet header value;
    demodulating, in response to the producing, a non-spread spectrum modulated data payload within the data packet; and
    producing, in response to demodulating the non-spread spectrum modulated data payload, demodulated data contained within the non-spread spectrum modulated data payload.

13. The method of claim 12, further comprising:
    producing, in response to the demodulating the packet header, a frequency correction signal indicating a received frequency offset for the wireless communications signal, and wherein the demodulating the non-spread spectrum modulated data payload adjusts a communications signal frequency offset based upon the frequency correction signal.

14. The method of claim 12, further comprising:
    producing, in response to demodulating the packet header, a channel symbol time synchronization signal indicating a chip transition time for the communications signal, and wherein the demodulating the non-spread spectrum modulated data payload synchronizes demodulation of the non-spread spectrum modulated data payload based upon the chip transition time synchronization signal.

15. The method of claim 12, further comprising applying, prior to the demodulating the non-spread spectrum modulated data payload, a complex magnitude and phase corrections to the wireless communications signal.

16. The method of claim 12, wherein the data packet comprises a data frame structure, the method further comprising:
    producing, in response to demodulating the packet header, a frame synchronization signal indicating a start of a data frame within the data frame structure, and wherein the producing demodulated data is based upon the frame synchronization signal.

17. The method of claim 12,
    wherein the wireless communications signal is represented by a complex value baseband signal received from a radio frequency signal processor, the radio frequency signal processor having a phase noise characteristic, and wherein the demodulating the non-spread spectrum modulated signal further comprises detecting channel symbols with at least one of a frequency modulation discriminator and a differential phase detector, wherein the at least one of the frequency modulation discriminator and the differential phase detector have a high pass frequency response for phase noise sensitivity that compensates for the phase noise characteristic.

18. The method of claim 12,
    wherein the predefined packet header value comprises one of
        a start of frame delimiter value defined pursuant to IEEE 802.15.4 which indicates that the data packet conforms to a format defined pursuant to IEEE 802.15.4, and
        a start of frame delimiter value not defined by IEEE 802.15.4 which indicates that a payload data length portion and a data payload portion of the data packet are the non-spread spectrum modulated data payload that are modulated with a non-spread spectrum technique.

19. The method of claim 18, wherein the data payload length portion and the data payload portion of the data packet that are modulated with a non-spread spectrum technique are modulated in a phase coherent, offset quadrature phase shift keying technique defined for spreading chips pursuant to IEEE 802.15.4.

20. An IEEE 802.15.4 receiver processing circuit, comprising:
    a spread spectrum signal demodulator for demodulating a packet header of a data packet communicated through a wireless communications signal,
        the packet header being modulated with a spread spectrum technique and corresponding to a packet header format defined pursuant to IEEE 802.15.4,
        the spread spectrum signal demodulator producing at least a packet header detection signal representing a successful detection of one of two predefined packet header values that comprise a start of frame delimiter value defined pursuant to IEEE 802.15.4 and a start of frame delimiter value not defined by IEEE 802.15.4;
    a non-spread spectrum signal demodulator, communicatively coupled to the spread spectrum signal demodulator, the non-spread spectrum signal demodulator for demodulating, in response to the successful detection of the predefined packet header value comprising the start of frame delimiter value not defined by IEEE 802.15.4, a non-spread spectrum modulated data payload encoded onto the wireless communications signal as part of the data packet; and
    a data output selector for selecting demodulated data produced by either one of both the spread spectrum signal demodulator and the non-spread spectrum signal demodulator.

* * * * *

UNITED STATES PATENT AND TRADEMARK OFFICE
CERTIFICATE OF CORRECTION

| | | |
|---|---|---|
| PATENT NO. | : 7,693,191 B2 | Page 1 of 1 |
| APPLICATION NO. | : 11/691301 | |
| DATED | : April 6, 2010 | |
| INVENTOR(S) | : Robert Mark Gorday et al. | |

It is certified that error appears in the above-identified patent and that said Letters Patent is hereby corrected as shown below:

Col. 14, line 51:

"of" should be changed to --or--.

Signed and Sealed this

Fifteenth Day of June, 2010

David J. Kappos
*Director of the United States Patent and Trademark Office*